(12) United States Patent
Hattori (10) Patent No.: US 7,990,566 B2
(45) Date of Patent: Aug. 2, 2011

(54) IMAGE FORMING DEVICE

(75) Inventor: Hiroshi Hattori, Gifu (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 820 days.

(21) Appl. No.: 12/071,433

(22) Filed: Feb. 21, 2008

(65) Prior Publication Data

US 2008/0198415 A1  Aug. 21, 2008

(30) Foreign Application Priority Data

Feb. 21, 2007 (JP) ................................. 2007-041097

(51) Int. Cl.
*G06K 15/00* (2006.01)
*H04N 1/00* (2006.01)

(52) U.S. Cl. ........................ 358/1.18; 358/404; 358/1.16

(58) Field of Classification Search .................. 358/1.16, 358/1.18, 404, 444, 443, 471, 1.9
See application file for complete search history.

(56) References Cited

U.S. PATENT DOCUMENTS

| | | | |
|---|---|---|---|
| 5,923,013 A | 7/1999 | Suzuki et al. | |
| 6,362,870 B2 * | 3/2002 | Mui et al. | 355/24 |
| 6,474,881 B1 | 11/2002 | Wanda | |
| 6,501,562 B1 * | 12/2002 | Nakagiri et al. | 358/1.2 |
| 6,916,127 B2 | 7/2005 | Wanda | |
| 6,999,198 B1 | 2/2006 | Nakagiri et al. | |
| 7,859,709 B2 * | 12/2010 | Mori | 358/1.18 |
| 2007/0047020 A1 * | 3/2007 | Kim | 358/450 |

FOREIGN PATENT DOCUMENTS

| | | |
|---|---|---|
| JP | 63-244224 | 10/1988 |
| JP | 9-174956 | 7/1997 |
| JP | 9-200463 | 7/1997 |
| JP | 10-011233 | 1/1998 |
| JP | 10-027076 | 1/1998 |
| JP | 10-143342 | 5/1998 |
| JP | 2001-134561 | 5/2001 |
| JP | 2001-157011 | 6/2001 |
| JP | 2004-348622 | 12/2004 |
| JP | 2004-357324 | 12/2004 |
| JP | 2005-004798 | 1/2005 |
| JP | 2005-11263 | 1/2005 |
| JP | 2005-174122 | 6/2005 |

OTHER PUBLICATIONS

Japanese Notification of Reasons of Rejection, with English Translation, issued in Japanese Patent Application No. JP 2007-041097, dated Feb. 17, 2009.

* cited by examiner

*Primary Examiner* — Jerome Grant, II
(74) *Attorney, Agent, or Firm* — Banner & Witcoff, Ltd (57) ABSTRACT

An image forming device configured as follows. A user is allowed to select desired print data files to be printed from among print data files stored in an external storage. A file list generating unit generates a list of the desired print data files selected by the user. The list includes an order of the desired print data files. A page arrangement unit arranges each page of the desired print data files on each recording sheet based on the list of the desired print data, a print mode and a total number of pages of the desired print data files. Blank pages to be added to complete the arrangement of pages of the print data files with respect to the recording sheets are generated. Page data is retrieved based on the arrangement of pages and is converted to image data, which is printed by an image data printing unit.

10 Claims, 8 Drawing Sheets

DOCUMENT LIST

| ORDER OR PRINT | PRINT DATA FILE NAMES | THE NUMBER OF PAGES |
|---|---|---|
| 1 | document1.prn | 5 |
| 2 | document2.prn | 2 |
| 3 | | |
| 4 | | |
| 5 | | |

DOCUMENT FILE 1 ( FIVE PAGES IN TOTAL )

Doc1 Page1 | Doc1 Page2 | Doc1 Page3 | Doc1 Page4 | Doc1 Page5

DOCUMENT FILE 2 ( TWO PAGES IN TOTAL )

Doc2 Page1 | Doc2 Page2

2-IN-1 PRINTING        4-IN-1 PRINTING

IMAGE FORMING DEVICE

CROSS-REFERENCE TO RELATED APPLICATION

This application claims priority under 35 U.S.C. §119 from Japanese Patent Application No. 2007-041097 filed on Feb. 21, 2007. The entire subject matter of the application is incorporated herein by reference.

BACKGROUND

1. Technical Field

The following description relates to an image forming device capable of reading print data from an external storage which is detachably connectable to the image forming device and printing the print data.

2. Related Art

Conventionally, there has been known an image forming device capable of performing direct printing. The direct printing is a function of retrieving print data stored in the external storage detachably attached to the image forming device, developing the print data into image data (e.g., bitmap data), and printing images on recording sheets based on the developed image data. Typically, when the print data is stored in the external storage, a print data file is output at each print job.

When the print data is printed, generally, an image corresponding to single page is printed on one page of a recording sheet. Recently, there is a case where a plurality of images respectively representing a plurality of pages of a document are collectively printed on one page of a recording sheet. For example, on one page of a recording sheet, images representing two pages of a document may be collectively printed (i.e., 2-in-1 printing). There is also a case where images representing four pages of a document are collectively printed on one page of a recording sheet (i.e., 4-in-1 printing). There is known a case where images corresponding to two pages of a document are printed on both sides of a recording sheet, respectively (i.e., both-side printing). Further, there is also known a case where the both-side printing is performed to a plurality of recording sheets so that the plurality of recording sheets are bound and the plurality of pages are arranged in an appropriate order (i.e., booklet printing).

Incidentally, it is conventionally known that a plurality of pieces of print data output at a plurality of print jobs, respectively, may be temporarily combined so that the plurality of pieces of print data are regarded as a single piece of print data corresponding to a single print job (i.e., the combined print job), and the collective printing is performed based on such print data corresponding to the combined single print job. An example of such an image forming device is disclosed in Japanese Patent Provisional Publication No. 2005-11263 (hereinafter, referred to as '263 publication).

SUMMARY OF THE INVENTION

Figure 9A:
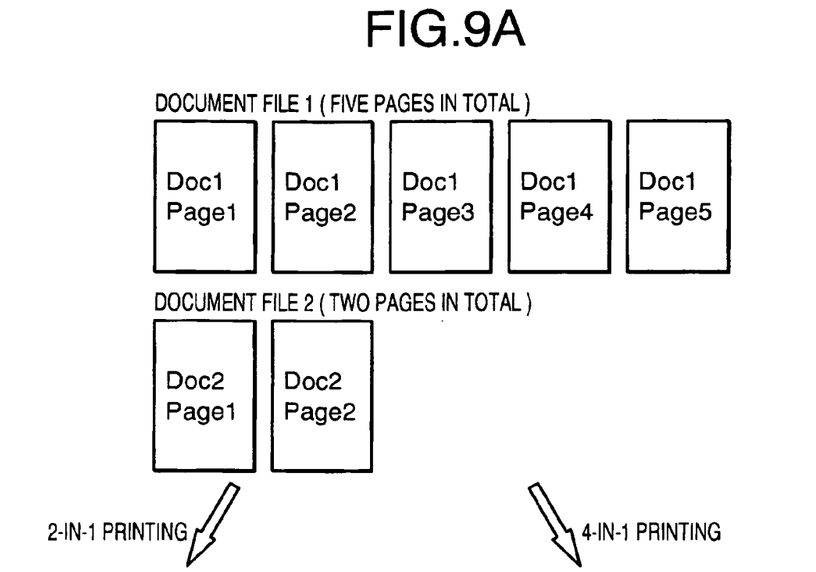
FIGS. 9A-9C show a conventional arrangement of a plurality of pages when 2-in-1 printing and 4-in-1 printing are executed according to the present invention.
Figure 10A:
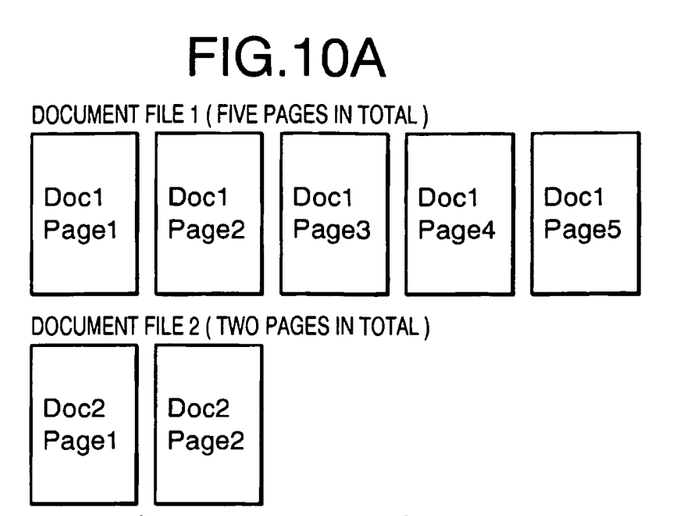
FIGS. 10A-10C show a conventional arrangement of a plurality of pages when both-side printing and booklet printing are executed according to the present invention.

In the conventional image forming device described above, as shown in FIG. 9A or 10A, when a print job for printing document file 1 having five pages and document file 2 having two pages are combined, the print data is printed on seven pages of the recording sheets.

There could be a case where the document file 1 and document file 2 as a single document and further a plurality of pages are to be collected on each page of the recording sheets.

Figure 9B:
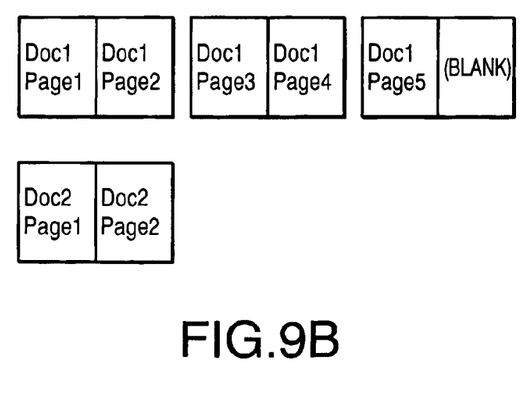

When each of the print jobs respectively for printing the document file 1 and document file 2 generated by a host computer is the 2-in-1 printing, if the two print jobs are combined, the following problem occurs. That is, as shown in FIG. 9B, if the number of pages of the document file 1 is odd (e.g., 5 pages), the last page of the printout of the document file 1 (i.e., the right-hand side half of the third recording sheet) is a blank page.

Figure 9C:
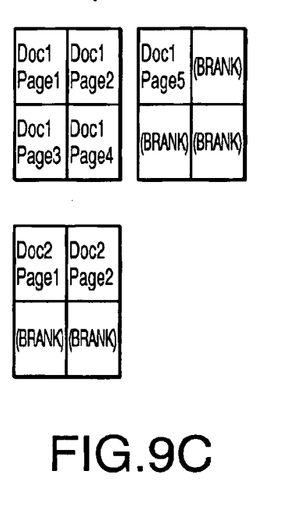

When each of the print jobs respectively for printing the document file 1 and document file 2 generated by the host computer is the 4-in-1 printing, and the two print jobs are combined, there will be blank areas (i.e., ¼ through ¾ of the entire area depending on the number of the pages of the document file 1) on the last recording sheet as sown in FIG. 9C.

Figure 10B:
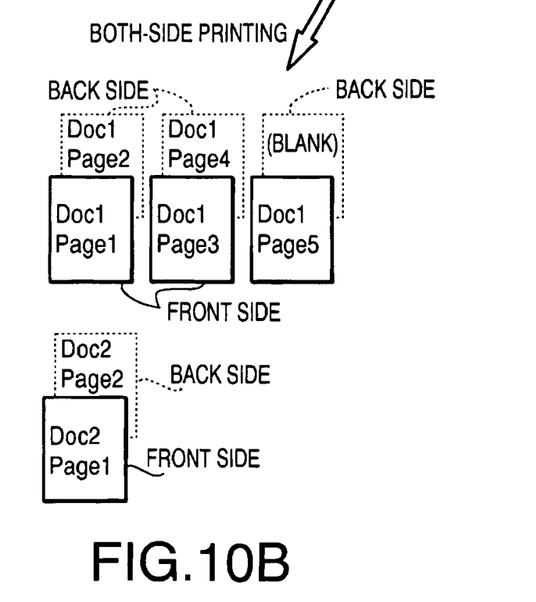

Further, if each of the print jobs for printing the document file 1 and document file 2 is the both-side printing, and the two print jobs are combined, as shown in FIG. 10B, the back surface of the third sheet of the printout of the document file 1 is a blank page.

Figure 10C:
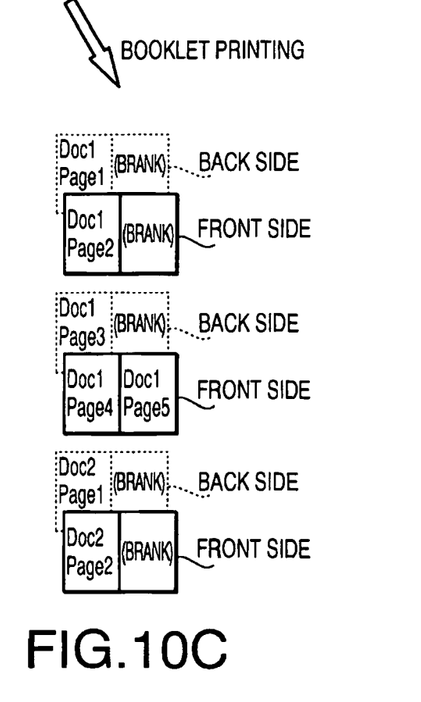

Furthermore, if each of the print jobs for printing the document file 1 and document file 2 is the booklet printing, as shown in FIG. 10C, the booklet printing is performed for each print job, and blank pages are generated for each of the printouts of the document file 1 and document file 2. Such printouts are bound at the center of each page, the printout of the document file 1 and the printout of the document file 2 do not make continuous pages, and the booklet cannot be formed as a whole.

As described above, if a plurality of pages are collectively printed on each recording sheet, blank pages are generated and a single document may not be formed merely by combining the two print jobs. If the booklet printing is performed, the printouts of the document file 1 and document file 2 may not form, as a whole, a booklet.

In consideration of the above problem, the present invention is advantageous in that an improved image forming device is provided, with which an appropriate printout can be obtained, when the direct printing is performed, even if a plurality of print jobs are combined and a plurality of pages are collectively printed on each recording sheet.

According to another aspect of the invention, there is provide an image forming device to which an external storage storing print data files for direct printing is detachably connectable. The image forming device is provided with a selection unit configured to allow a user to select desired print data files to be printed from among the print data files stored in the external storage, a file list generating unit configured to generate a list of the desired print data files selected by the user, the list of the desired print data files including an order of the desired print data files, a page arrangement unit configured to arrange each page of the desired print data files on each recording sheet based on the list of the desired print data, a print mode representing an arrangement of pages of the desired print data on the recording sheet, and a total number of pages of the desired print data files, a blank page generating unit configured to generate blank pages to be added to complete the arrangement of pages of the print data files with respect to the recording sheets, an image data generating unit configured to generate image data, the image data generating unit retrieving page data based on the arrangement of pages and converting the retrieved page data to image data, subsequently, and an image data printing unit configured to print the image data.

According to aspects of the invention, there is provided an image forming device to which an external storage storing a plurality of print data files is detachably connectable. The image forming device is provided with a list storing unit configured to store a list of print data files to be combined and printed and an order at which the print data files are combined, an image data developing unit configured to determine an order of printing of each page of the print data files based on the list of print data files and a print mode representing how each page of the print data files is arranged on a recording sheet, and converting each page of the print data files to image data in accordance with the order of printing, a blank page generating unit configured to determine a number of blank pages to be added based on the print mode and a sum of the pages of the print data files to be combined, the blank page generating unit generating image data corresponding to the determined number of blank pages, and a printing unit configured to print the image data generated by the image data developing unit and the image data generated by the blank page according to how each page of the print data files is arranged on the recording sheet.

With the above configuration, an appropriate printout can be obtained, when the direct printing is performed, even if a plurality of print jobs are combined and a plurality of pages are collectively printed on each recording sheet.

DETAILED DESCRIPTION OF THE EMBODIMENT

Hereinafter, referring to the accompanying drawings, embodiment according to the invention will be described in detail.

Figure 1:
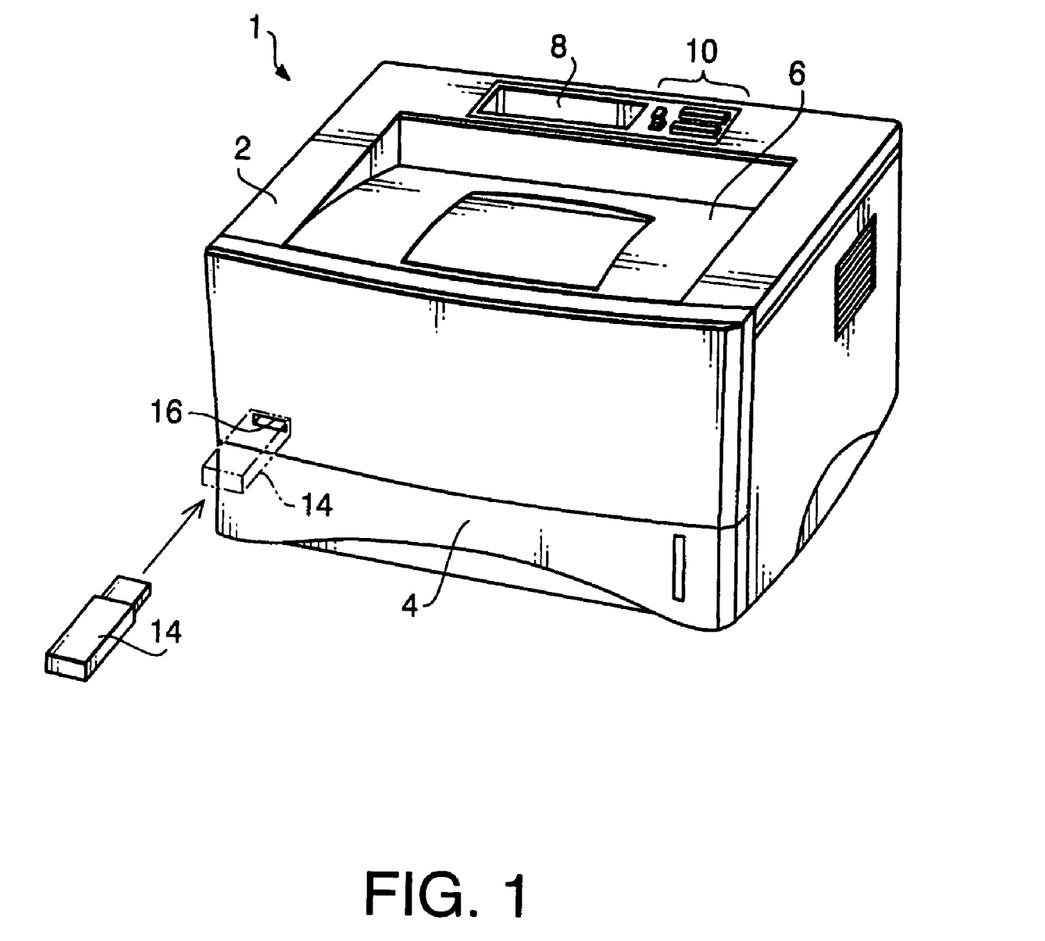
FIG. 1 is a perspective view of an image forming device according to an aspect of the invention.

FIG. 1 is a perspective view showing an appearance of an image forming device 1 according to embodiment of the invention. As shown in FIG. 1, the image forming device 1 is provided with a main body 2, and a sheet cassette 4 for accommodating a stack of recording sheets, which is provided at a lower part of the main body 2 such that the sheet cassette 4 can be drew from the main body 2. At an upper portion of the main body 2, a sheet discharge tray section 6 for receiving the discharged recording sheets on which images are printed. The image forming device 1 is further provided with a displaying unit 8 including an LCD (Liquid Crystal Display), an operation unit 10 allowing a user to input various commands using operation keys provided thereto. The main body 2 is formed with an insertion slot 16, in which an external storage 14 such as a USB memory is removably inserted.

Figure 2:
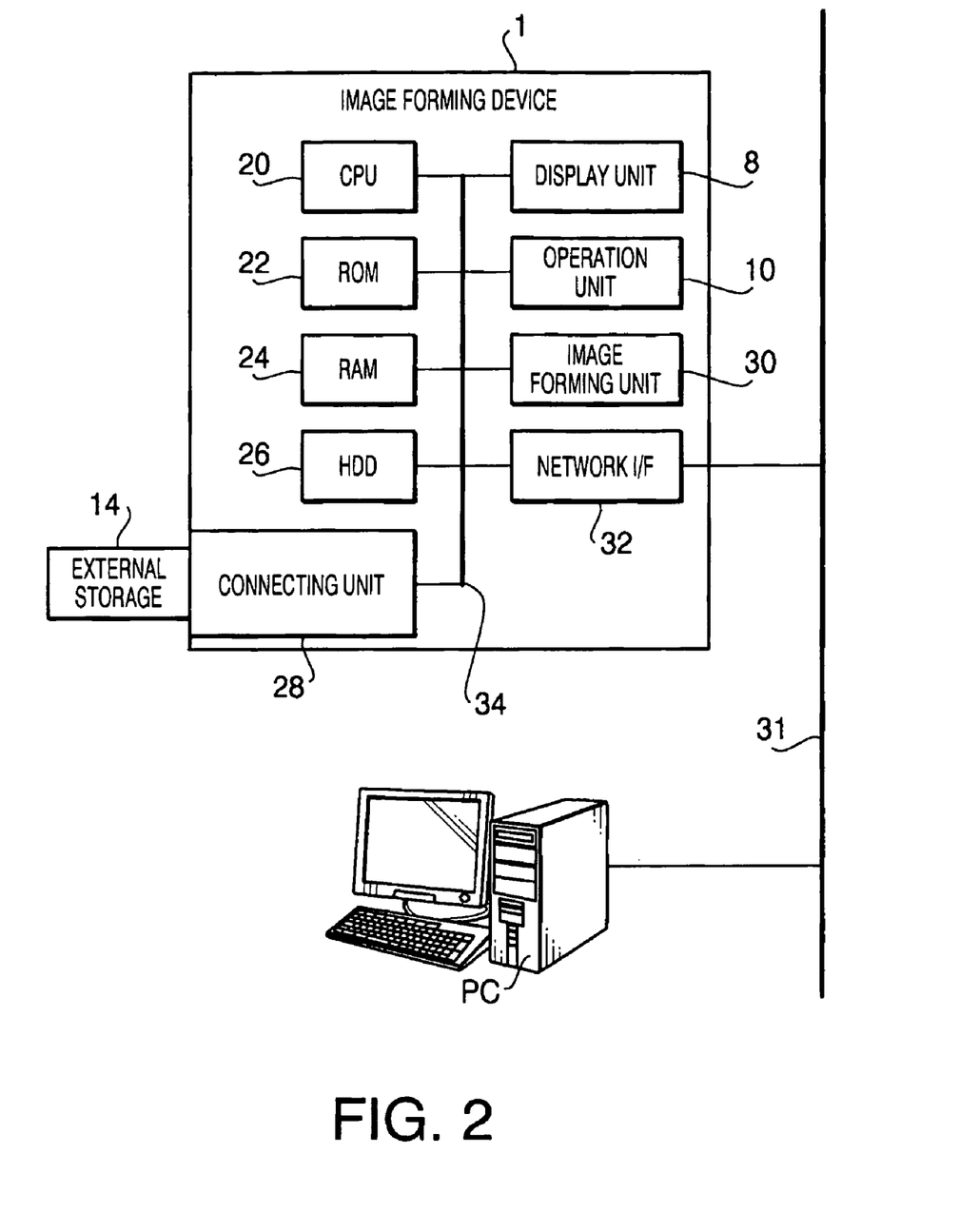
FIG. 2 is a block diagram showing an electrical configuration of the image forming device according to aspects of the invention.

FIG. 2 is a block diagram showing an electrical configuration of the image forming device 1. The image forming device 1 is provided with a CPU (Central Processing Unit) 20 which executes programs to control operation of the image forming device 1, a ROM (Read Only Memory) 22 storing various programs to be executed by the CPU 20, a RAM (Random Access Memory) 24 which temporarily stores data such as processing results, an HDD (Hard Disk Drive) 26 which stores various data. The image forming device 1 further includes a connecting unit 28 to which the external storage 14 is connected, the displaying unit 8, the operation unit 10, an image forming unit 30 which is controlled by the CPU 20 based on the programs and forms images on the recording sheets, and a network interface 32 which is configured to connect the image forming device 1 to external devices such as a PC (Personal Computer) or the like through a network 31 such as a LAN (Local Area Network). The above-described units are interconnected through a bus 34 such that data can be exchanged thereamong.

According to the exemplary embodiment, the external storage 14 is a stick-type USB (Universal Serial Bus) memory provided with a non-volatile rewritable memory. The USB memory can be removably connected to the image forming device 1, that is, the external storage 14 can be removably connected to the connecting unit 28. It should be noted that the external storage 14 need not be the USB memory, but any medium which can be removably connected to the image forming device 1 and data can be retrieved therefrom or written therein. Thus, alternatively or optionally, a floppy disk®, an external hard disk, magneto-optical disc drive, or a non-volatile memory card can be used as the external storage 14.

The printing operation is executed by the image forming unit 30 in accordance with a well-known electrophotographic imaging process. That is, a laser beam is ON/OFF modulated based on the image data and scanned within a predetermined angular range so that the surface of a photoreceptive drum, which is rotated, is scanned by the modulated laser beam (not shown) to form a electrostatic latent image. The latent image is then developed as toner is applied thereto, thereby a toner image is formed. The toner image is transferred onto a recording sheet which is fed from the sheet feed cassette 4. The toner image transferred on the recording sheet is fixed on the recording sheet, which is discharged and stacked on the tray section 6.

When the both-side printing is executed, the image forming unit 30 prints an image on one side of a recording sheet, and then reverses the recording sheet and forms another image on the other side of the same recording sheet.

As described above, the image forming unit 30 is configured as a so-called page printer, which forms an page of the image (toner image) on one page of the recording sheet. It should be noted that the invention need not be limited to this configuration (i.e., the electrophotographic imaging device), but can be of other types such as an inkjet type serial printer (i.e., not a page printer).

The image forming device 1 generates the image data by developing print data, which is transmitted from an external PC via the network interface 32 and/or stored in the external storage 14, or a frame memory inside the RAM 24. The image data thus developed in the frame memory of the RAM 24 is transmitted to the image forming unit 30 as CMYK (Cyan, Magenta, Yellow and Black) data or K data (in case of greyscale image). The image forming unit 30 prints images represented by the image data on the recording sheet. The printing operation may be color printing or monochromatic printing.

The print data is, for example, PDL (Page Description Language) data or a predetermined printable format such as PDF, TIFF, or JPEG format data.

Figure 3:
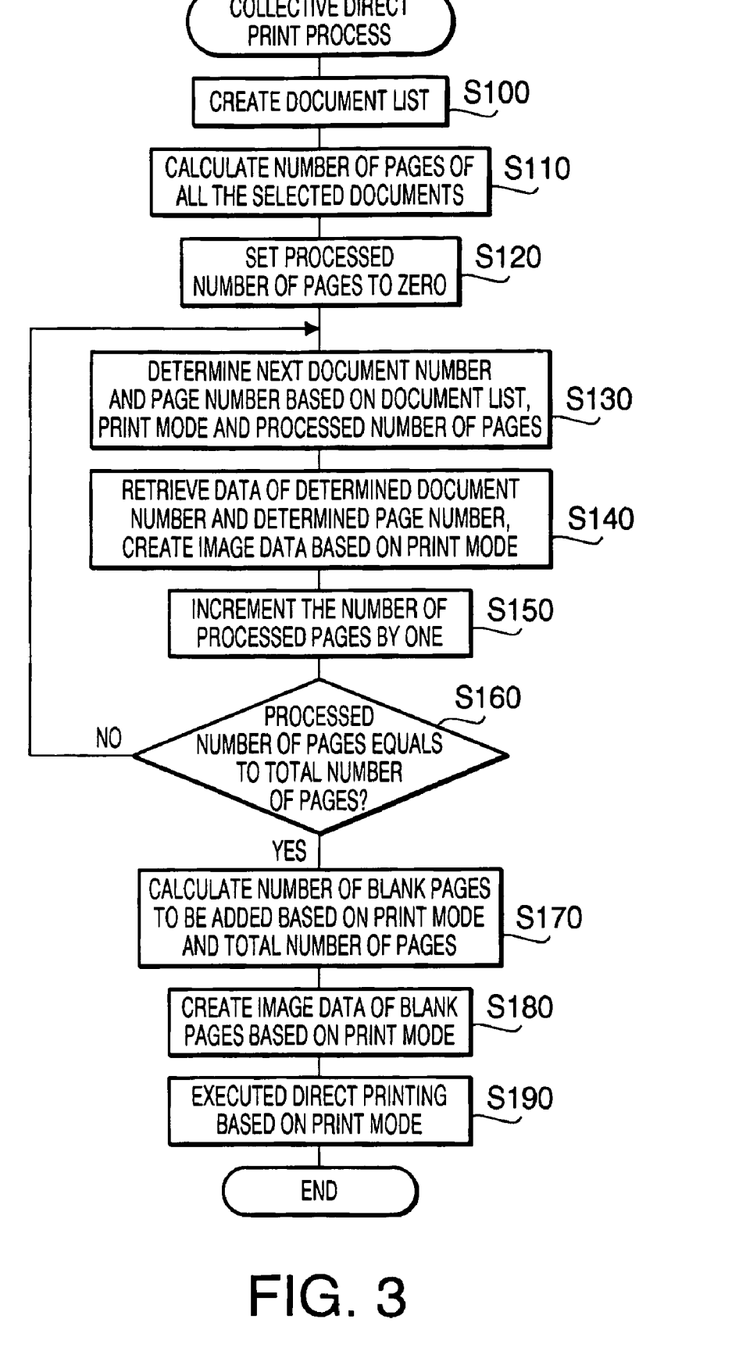
FIG. 3 is a flowchart illustrating the collective direct print process according to the embodiment.

Next, a collective direct print process performed by the image forming device 1 will be described, referring to a flowchart. FIG. 3 is a flowchart illustrating the collective direct print process according to the embodiment.

The collective direct print process is started when the user operates the keys of the operation unit 10 and selects a menu for starting the collective direct print process from among a plurality of menus displayed on the display unit 8. It should be noted that the external storage 14 should be inserted in the insertion slot 16 in advance.

It should be noted that, before the collective direct print process is executed, the print data file(s) should be stored in the external storage 14 in advance. The print data file(s) is(are) stored in the external storage 14 by the external device (PC) when the external storage 14 is connected to the external device (PC). It should be noted that the external device (PC) is not necessarily connected to the image forming device 1 via the network 31.

For example, when application software such as a word processing application, a spreadsheet application, an image processing application or the like installed in the external device is executed, if a print menu of the application is selected by the user, and "output to file" is selected in the menu, the print data is stored in the external storage 14. The print data file is the PDL data file or a file suitable to the direct print (e.g., PDF, TIFF, JPEG etc.).

That is, after creating text data, spreadsheet data etc. with applications (word processing application, spreadsheet application, etc.) of an external PC, the user may select a print menu of the application, and selects printing. Then, the text data, spreadsheet data, etc. are converted into the PDL data by the printer driver software. The thus converted PDL data is stored in the external storage 14 as described above.

A PDF data can also be used. The PDF is a file format developed by Adobe system and widely used format. The PDF contains not only text, image information, but layout information, font information and the like and enables the direct printing without relying on an application. Further, the image file formats such as the TIFF format and JPEG format can be used as the data file format and are stored as they are when the print data is stored in the external device 14. If the image forming device 1 is implemented with font data, a so-called text type print data can also be subject to the direct printing. Therefore, in such case, the print data of a TXT format may be stored in the external storage 14.

When the print data is stored in the external storage 14, without the external PC, images represented by the print data can be printed by the image forming device 1. That is, for printing images represented by the print data stored in the external storage 14, the user may remove the external storage 14 from the external PC, and connect the external storage 14 to the image forming device 1.

When the collective direct print process is started, the process generates a selection document list (S100). The selection document list is a list of a plurality of print data files which are selected by the user among the print data files stored in the external storage 14. The print data files listed in the selection document list are combined and printed in accordance with the collective direct print.

Figure 4A:
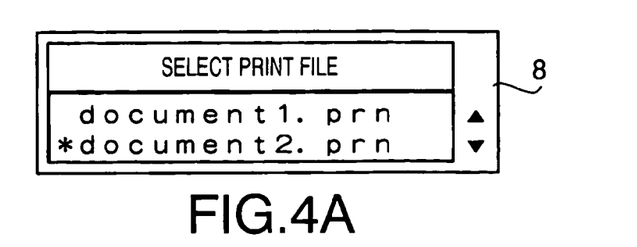
FIGS. 4A-4B show file selection windows displayed on a display unit.

Specifically, the process displays every two print data files stored in the external storage 14 on the display unit 8 as show in FIG. 4A. As the user operates a scroll key of the operation unit 10, the displayed print data files are scrolled. Then, the user operates a cursor key to designate one of the two print data files. In response to operation of a set key of the operation unit 10, the designated one of the two print data files displayed on the display unit 8 is selected. As above, by scrolling the print data files and selecting desired files by their names, the selection document list is created.

Figure 5:
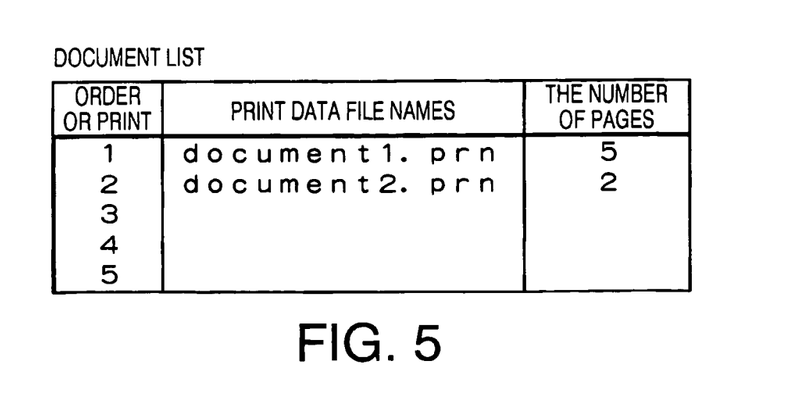
FIG. 5 shows a list of selected documents displayed on the display unit.

FIG. 5 shows an example of the selection document list. The selection document list is stored in the RAM 24. It should be noted that, the selection document list includes information of the order of printing of the selected documents. That is, when the selected documents are combined for direct printing, the order of the documents is determined in accordance with the information of the order included in the selected document list. Incidentally, the order of the documents may be set in the order of selection. Alternatively or optionally, the order may be changeable after the selection document list is once created. In order to change the order change the order, for example, the list is displayed on the display unit 8, and by operating certain keys of the operation unit 10, the order of the documents may be changed.

According to the embodiment, the selection document list further includes the information of the number of pages of each document as shown in FIG. 5. The number of the pages is obtained from the print data file stored in the external storage 14.

Figure 4B:
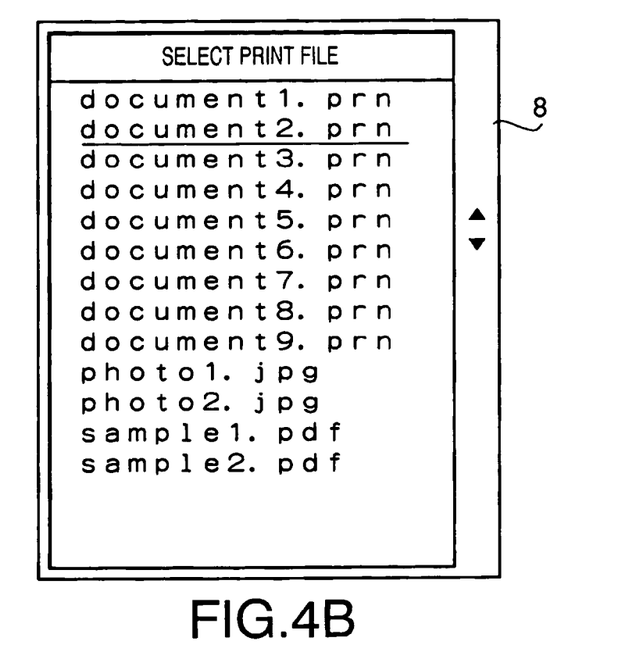

If the display unit 8 is a relatively large displaying area as shown in FIG. 4B, and more number of file names can be displayed, a cursor movable among the displayed file names is introduced, and the user may select a certain key operation of the operation unit 10 to select a print data file on which the cursor is located. Also in this case, the order may be determined in accordance with the order of the selection, or selection of the print data files and determination of the order or printing may be done separately.

After storing the selection document list containing the print data file names, the order of printing and the number of pages of each document in the external storage 24, the process calculates the sum of the number of pages of the selected documents (S110). In this example shown in FIG. 5, the total number of pages is seven (i.e., 5+2=7).

Next, the process resets the page counter for counting the processed (printed) number of pages to zero (S120), and determines document number and page number to be printed based on the selection document list, print mode and the value of the page counter (S130).

The print mode represents whether the printing operation is executed in the collective print (e.g., 2-in-1 printing, 4-in-1 printing), both-side printing or booklet printing. The information of the print mode is designated by the user as the user selects one of the modes displayed on the display unit 8.

The document number represents the order number of the selection document list, which indicates which one of the listed document is currently processed, and the page number represents the page number of the currently processed document.

Figure 6A:
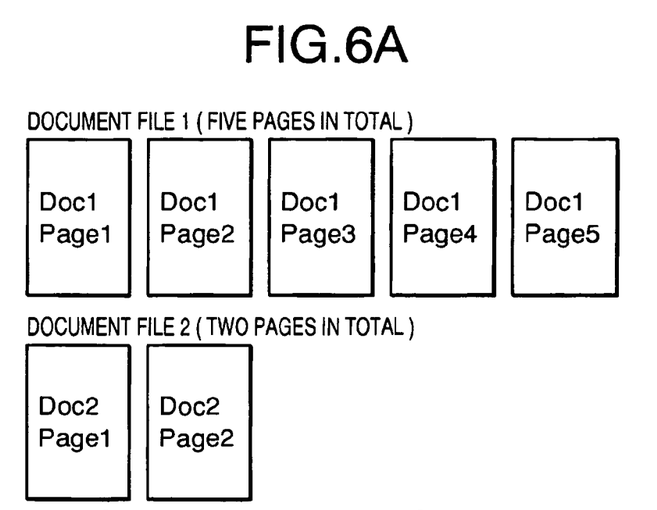
FIGS. 6A-6C show an arrangement of a plurality of pages when 2-in-1 printing and 4-in-1 printing are executed according to the present invention.
Figure 6B:
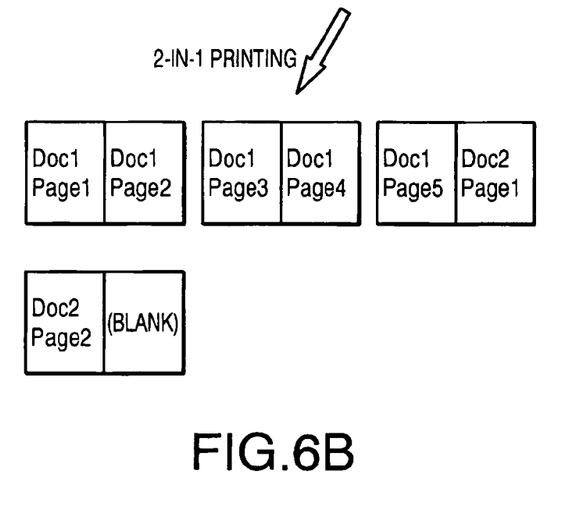
Figure 6C:
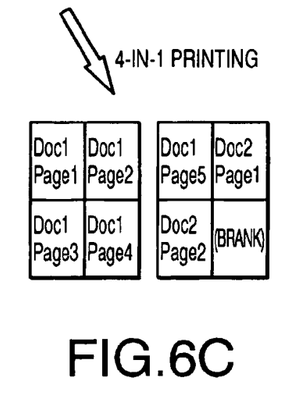
Figure 7A:
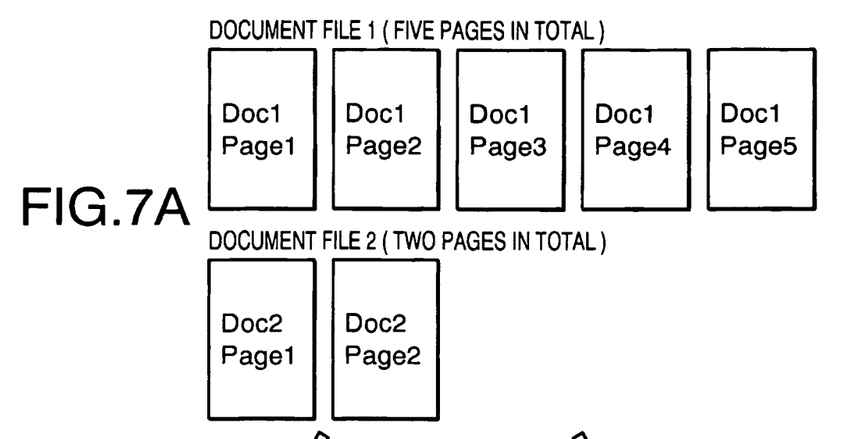
FIGS. 7A-7C show an arrangement of a plurality of pages when both-side printing and booklet printing are executed according to the present invention.
Figure 7B:
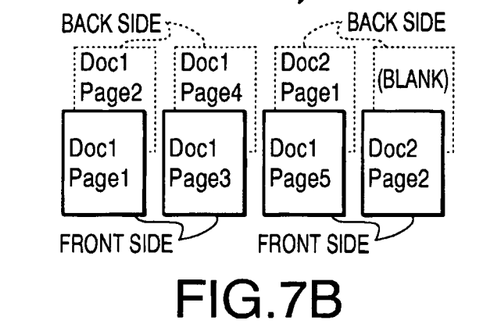

When the selected documents are as shown in FIG. 6A or FIG. 7A, the value of the page counter is zero, and the print mode is (a) 2-in-1, (b) 4-in-1 or (c) both-side printing, the document number is set to 1 (i.e., the first document), and the page number is set to one (of the currently set document) as shown in FIG. 6B, 6C or 7B.

Figure 7C:
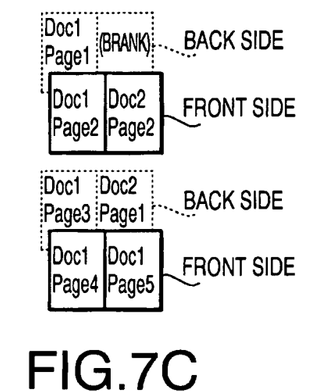

If the print mode is the booklet printing and the value of the page counter is zero, as shown in FIG. 7C, the document number is set to one, while the page number is set to two (of the currently set document).

Next, the process retrieves the page data identified by the document number and page number, and generates the image data by rasterizing the page data (S140). Specifically, when the print mode is 2-in-1, 4-in-1 or both-side printing, the process retrieves, as print data, the data of the first page of the first order document from the external storage 14, and rasterizes the retrieved data to develop bitmap data in a frame memory defined in the RAM 24, thereby generating the image data.

When the image data is generated, if the print mode represents the 2-in-1 printing, as shown in FIG. 6B, the retrieved print data is converted into the bitmap data representing a reduced image corresponding to the left-hand side half of the front surface of the recording sheet. If the print mode represents the 4-in-1 printing, as shown in FIG. 6C, the retrieved print data is converted into the bitmap data representing a reduced image corresponding to the upper left quarter area of the front surface of the recording sheet. If the print mode represents the both-side printing, as shown in FIG. 7B, the retrieved print data is converted into the bitmap data representing an image corresponding to the entire area of the front surface of the recording sheet.

If the print mode represents the booklet printing, as shown in FIG. 7C, the process retrieves the print data of the second page of the first order document from the external storage 14, and generates the image data by rasterizing the retrieved print data. It is noted that, in the booklet mode, the print data of the second page of the first order document is converted into the bitmap data representing a reduced image corresponding to the left half of the front surface of the recording sheet.

Next, the process adds one to the page counter (S150), and judges whether the value of the page counter reaches the sum of the pages of all the selected documents (S1609. If the value of the page counter is less than the sum of the pages calculated in S110 (S160: NO), the process repeats the steps S130 onwards.

That is, based on the selection document list, print mode and page counter, the process determines the document number and page number for the next print data (S130). Specifically, since the value of the page counter is one, if the print mode represents the 2-in-1, 4-in-1 or both-side printing, the process retrieves the page data of the second page of the first order document as the print data, and develops the bitmap data based on the retrieved page data to generates the image data. When the print mode represents the 2-in-1 printing, the image data represents an image printed on the right half of the front surface of the recording sheet as shown in FIG. 6B. When the print mode represents the 4-in-1 printing, the image data represents an image printed at an upper right quarter area of the front surface of the recording sheet as shown in FIG. 6C. When the print mode represents the both-side printing, the image data represents an image printed on an entire area of the back surface of the recording sheet.

If the print mode represents the booklet printing, as shown in FIG. 7C, the process retrieves the print data of the second page of the second order document from the external storage 14, and generates the image data by rasterizing the retrieved print data. It is noted that, in the booklet mode, the print data of the second page of the second order document is converted into the bitmap data representing a reduced image corresponding to the right half of the front surface of the recording sheet.

After the image data is generated, the process adds one to the page counter (S150), thereby the value of the page counter being two. Since the value of the page counter is less than the sum of the pages of all the selected documents (S160: NO), the steps S130-S160 are repeated to determine the document number and the page number one by one based on the selection document list, print mode and the value of the page counter. Then, the process retrieves page data identified by the determined document number and page number, and converts the page data into the image data (S140).

When the print mode represents the 2-in-1, 4-in-1 or both-side printing, after all the page data of the first order document has been converted into image data, the page data of the second order document is subsequently converted into image data.

When the print mode represents the booklet printing, the order of the pages is determined so that the pages of the printouts bound at the center thereof are arranged correctly, based on the sum of the pages of all the selected documents, and the process converts the page data for each page into the image data subsequently.

If the value of the page counter reaches the sum of the pages (S160: YES), the process calculates the number of blank pages to be added based on the print mode and the sum of the pages (S170). For example, if the document file 1 (5 pages) and document file 2 (2 pages) are combined and 2-in-1 printing is executed, four recording sheets are necessary, and one blank page, which corresponds to a half area of a surface of one recording sheet, is necessary.

If the document file 1 (5 pages) and document file 2 (2 pages) are combined and 4-in-1 printing is executed, two recording sheets are necessary, and one blank page, which corresponds to a quarter of a surface of one recording sheet, is necessary. In case of the booklet printing, two recording sheets are necessary and one blank page (a half of a surface of the recording sheet) is necessary.

After calculating the number of necessary blank pages, the process generates the image data corresponding to the calculated number of blank pages in accordance with the print mode (S180). Then, the process executes the direct printing based on the print mode (S190).

When the print mode represents the 2-in-1 printing, as shown in FIG. 6B, the image data of the first page of the first order document and the image data of the second page of the first order document (generated in S140) are printed such that they are arranged on left half and right half of one surface of the recording sheet, respectively.

On one surface of the second recording sheet, the image data of the third and the image data of the fourth pages of the first order document are printed, and on one surface of the third recording sheet, the image data of the fifth page of the first order document and the image data of the first page of the second order document are printed. On one surface of the fourth recording sheet, image data of the second page of the second order document and the image data of a blank page is printed.

When the print mode represents the 4-in-1 printing, as shown in FIG. 6C, the image data of the first page through the fourth page of the first order document (generated in S140) is printed such that they are arranged on four areas of one surface of the recording sheet. On one surface of the second recording sheet, the image data of the fifth page, the image data of the first and second pages of the second order document, and the image data of a one blank page are printed.

When the print mode represents the both-side printing, as shown in FIG. 7B, the image data of the first page and the image data of the second page of the first order document (generated in S140) are printed on front and back surfaces of the recording sheet, respectively. Similarly, the image data of the third page and the image data of the fourth page of the first order document are printed on the front and back surfaces of the second recording sheet, respectively. The image data of the fifth page of the first order document and the image data of the first page of the second order document are printed on the front and back surfaces of the third recording sheet. Then, the image data of the second page of the second order document and the image data of the blank page are printed on the front and back surfaces of the fourth recording sheet, respectively.

If the print mode represents the booklet printing, as shown in FIG. 7C, the image data of the second page of the first order document and the image data of the second page of the second order document are printed on the left and right halves of one surface of the first recoding sheet, respectively. On the back surface of the first recording sheet, the image data of the first page of the first order document and the image data of a blank page are printed, respectively.

Further, on the front surface of the second recording sheet, the image data of the fourth page of the first order document and the image data of the fifth page of the first order document are printed, and the image data of the third page of the first order document and the image data of the first page of the second order document are printed on the back surface of the second recording sheet.

When the direct printing is completed, the collective direct print process is finished.

Figure 8:
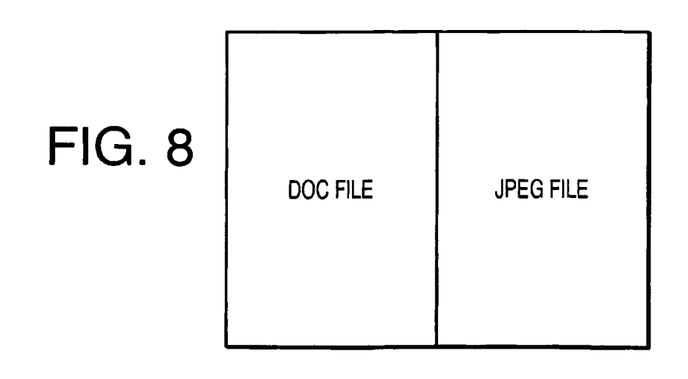
FIG. 8 shows an example of a printout when different print data files are combined.

In the above-described exemplary embodiment, the documents of the same file type are combined and printed. The invention need not be limited to such a configuration, and a plurality of documents of different file types can be combined and printed in a similar manner as shown in FIG. 8. That is, even if the print data files representing different file types are stored in the external storage 14, the above described collective direct print process can be performed similarly.

As described above, when a plurality of print data files are combined, and the collective printing is performed, unnecessary blank pages will not be generated between combined documents. For example, when the first order document represents text data created by word processing software, and the second order document represents spreadsheet data created by spreadsheet software, the print data corresponding to such documents can be appropriately combined, and the collective printing can be performed without generating unnecessary blank pages therebetween.

It should be noted that the invention need not be limited to the above-described exemplary embodiment, but various modification can be made without departing from the scope of the invention.

What is claimed is:

1. An image forming device to which an external storage storing print data files for direct printing is detachably connectable, the image forming device comprising:
   a selection unit configured to allow a user to select desired print data files to be printed from among the print data files stored in the external storage;
   a processing unit;
   non-transitory computer readable media storing instructions therein, which when executed by the processing unit, cause the image forming device to provide:
      a file list generating unit configured to generate a list of the desired print data files selected by the user, the list of the desired print data files including an order of the desired print data files;
      a page arrangement unit configured to arrange each page of the desired print data files on each recording sheet based on the list of the desired print data files, a print mode representing an arrangement of pages of the desired print data files on the recording sheets, and a total number of pages of the desired print data files;
      a blank page generating unit configured to generate blank pages to be added to complete the arrangement of pages of the print data files with respect to the recording sheets; and
      an image data generating unit configured to generate image data, the image data generating unit retrieving page data based on the arrangement of pages and converting the retrieved page data to image data, subsequently; and
   an image data printing unit configured to print the image data.

2. The image forming device according to claim 1, wherein the print mode represents a collective printing for arranging a plurality of pages on one surface of each recording sheet.

3. The image forming device according to claim 1, wherein the print mode represents a two-sided printing for arranging two pages on both surfaces of each recording sheet, respectively.

4. The image forming device according to claim 1, wherein the print mode includes a booklet printing for arranging a plurality of pages on both sides of each recording sheet such that, when a plurality of recording sheets on which the image data is printed is bound at a center thereof, the plurality of pages is arranged in an appropriate order.

5. The image forming device according to claim 1, wherein the print data files include data to be printed on a plurality of recording sheets.

6. The image forming device according to claim 1, further comprising a printing order input unit that allows a user to set a printing order of the desired print data files.

7. The image forming device according to claim 1, wherein the non-transitory computer readable media storing instructions therein, which when executed, further cause the image forming device to provide a printing order setting unit that sets printing order of the desired print data files to the order selected by the user.

8. An image forming device to which an external storage storing a plurality of print data files is detachably connectable, comprising:
   a processing unit;
   non-transitory computer readable media storing instructions therein, which when executed by the processing unit, cause the image forming device to provide:
      a list storing unit configured to store a list of print data files to be combined and printed and an order in which the print data files are combined;
      an image data developing unit configured to determine an order of printing of each page of the print data files based on the list of print data files and a print mode representing how each page of the print data files is arranged on a recording sheet, and converting each page of the print data files to image data in accordance with the order of printing; and
      a blank page generating unit configured to determine a number of blank pages to be added based on the print mode and a sum of the pages of the print data files to be combined, the blank page generating unit generating image data corresponding to the determined number of blank pages; and
   a printing unit configured to print the image data generated by the image data developing unit and the image data generated by the blank page according to how each page of the print data files is arranged on the recording sheet.

9. The image forming device according to claim 8, further comprising a file selecting unit configured to allow a user to make a selection from among the plurality of print data files stored in the external storage.

10. The image forming device according to claim 9, wherein the list storing unit stores the order of printing the print data files as an order of selection made with the file selecting unit.

* * * * *

UNITED STATES PATENT AND TRADEMARK OFFICE
CERTIFICATE OF CORRECTION

| | |
|---|---|
| PATENT NO. | : 7,990,566 B2 |
| APPLICATION NO. | : 12/071433 |
| DATED | : August 2, 2011 |
| INVENTOR(S) | : Hiroshi Hattori |

Page 1 of 1

It is certified that error appears in the above-identified patent and that said Letters Patent is hereby corrected as shown below:

Column 10, Claim 7, Line 41:
Please delete "sets printing order" and insert --sets a printing order--

Signed and Sealed this
Third Day of April, 2012

David J. Kappos
*Director of the United States Patent and Trademark Office*